REISSUED AS NO. 15752 JAN 29 1925
J. COULTER.
CHAIN LINK.
APPLICATION FILED NOV. 14, 1921.
1,435,700.
Patented Nov. 14, 1922.
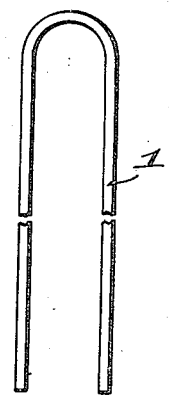
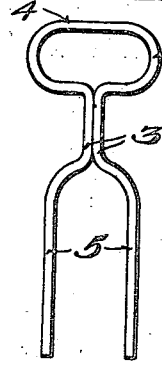
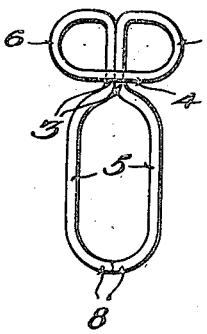
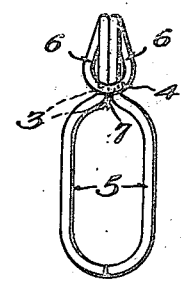
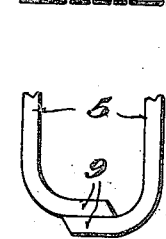
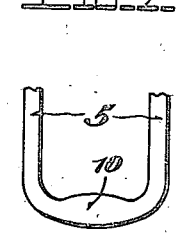
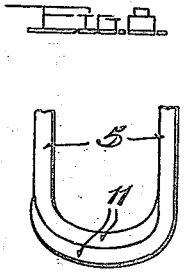
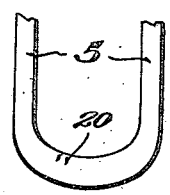
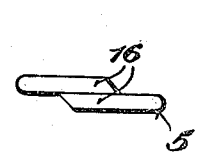
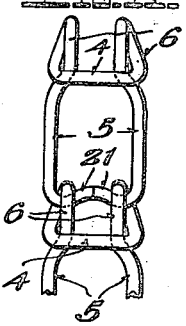
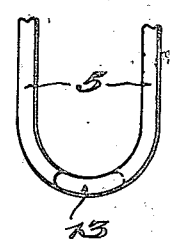
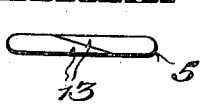
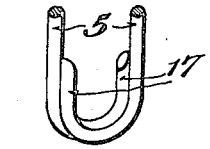
Inventor
James Coulter.
By
Attorney Patented Nov. 14, 1922.

1,435,700

UNITED STATES PATENT OFFICE.

JAMES COULTER, OF BRIDGEPORT, CONNECTICUT.

CHAIN LINK.

Application filed November 14, 1921. Serial No. 514,959.

*To all whom it may concern:*

Be it known that I, JAMES COULTER, a citizen of the United States, residing at the city of Bridgeport, in the county of Fairfield and State of Connecticut, have invented certain new and useful Improvements in Chain Links; and I do declare the following to be a full, clear, and exact description of the invention, such as will enable others skilled in the art to which it appertains to make and use the same.

This invention relates to certain new and useful improvements in chain links, and the primary object thereof is to provide a chain link wherein the double eyes at one end of the bow portion and the latter are formed entirely of an intermediate part of the wire and wherein the opposite or outer end of the bow portion is formed of the ends of the wire which latter are abutted together and preferably welded so as to greatly strengthen and reinforce the outer end of the bow portion.

In the drawings:

Figure 1 is an elevation of the blank in the first step of making the link;

Figure 2 is a like view in the second step;

Figure 3 is a like view in the third step;

Figure 4 is a front elevation of the completed link;

Figure 5 is a side elevation of Figure 4;

Figure 6 is a fragmentary elevation showing one way in which the ends of the blank may be welded together;

Figure 7 is a like view of Figure 6 showing the weld completed;

Figures 8 and 9 are views similar to Figures 6 and 7 showing another way of welding the blank ends;

Figure 10 is an end elevation of a further view of welding the blank ends;

Figure 11 is a front elevation of a form of link such as is preferred when the welding is omitted;

Figure 12 is a side elevation of a still further form of weld;

Figure 13 is an end elevation of Figure 12; and

Figure 14 is a fragmentary perspective view of another form of weld.

In proceeding in accordance with the present invention, one method which attains the object sought, resides in first forming the wire 1 into a U-shape as depicted at Figure 1, following which the blank is then shaped to afford an elongated loop 2 with contracted or neck portions 3 that lie between the loop and the side wires 5 as shown in Figure 2. The blank is then operated upon so as to fold or bring the cross wire 4 of the loop 2 in a position to extend transversely across the neck portions 3 at the bases of the latter. This step results in forming twin or double eyes 6, the structure being next shaped to fold or bend the eyes 6 rearwardly so that same lie in abutting engagement in which position the wire 4 extends across the eyes at their bases where they adjoin the inner end portion 7 of the bow, as depicted in Figures 4 and 5 of the drawings. In the preferred form of the link, the final step resides in welding the free ends 8 of the blank together at the outer end of the bow portion. This may be accomplished in a variety of ways. For example, as depicted in Figure 3, the ends may be made flat and brought into abutting engagement and then welded to produce the structure of Figure 4, or, as shown in Figures 6, ends 9 are lapped only a short distance so that when the welding occurs the swaging dies will squeeze the softened metal into substantially the shape shown at Figure 7, in which it will be observed that the cross bar portion 8 at the outer end of the link is strengthened at 10.

The preferred way is to lap the ends in the manner shown at Figure 8 where there are comparatively long laps 11, so that the completed chain will be substantially as is shown at 20 in Figure 9 in which it will be observed that not only the cross bar portion but the corner portions, where the cross bar joins the side wires of the bow, are greatly strengthened and reenforced.

In Figures 6 and 8, it will be observed that the terminal ends of the bow are overlapped one inside the other, but, prior to the welding, these ends may be overlapped, one alongside of the other, the ends being, of course, sheared off in all instances as shown in the drawings, and these ends can be lapped alongside of each other only a short distance as shown at 16, Figure 10, in which instance the result of the welding would be as is shown at Figure 7, or these ends can be lapped alongside of each other as is shown by forming the ends into J-shape as illustrated at 17 in Figure 14 in which instance the result of the welding would be as is shown at Figure 9. At Figures 12 and 13, the ends of the wire terminate at the bow end of the link and are sheared at an angle, and said ends, prior to welding, are lapped against each other laterally so as to present no increase in the cross sectional area of the bow end, the lapped portions being denoted by the numeral 13.

In some forms of wire chain resistance to tensile strains is not especially necessary, and therefore the welding operation above noted becomes unnecessary. In Figure 11 is illustrated a form of such chain in which the eyes 6 are spaced apart, the wire 4 extending across the bases of these eyes at the point where the latter adjoin the inner end of the bow portion in the manner above noted. But the extremities of the wire forming the link are merely abutted together at the outer end of the bow portion, and these extremities are preferably bent inwardly so as to form complementary arch portions 21, and in this connection it will be clear that the end of this bow portion is greatly strengthened by the arch formation.

This sort of chain is serviceable for use as "ladder chain" or "conveyor chain" both of which styles of chain are well known commercial products.

In all forms of the invention it will be seen that not only the twin eyes but the entire inner end structure of the link is formed integral or of continuous construction, while the terminals of the wire are brought together at the outer end of the bow so as to complete the bow formation.

The above described method of making the structure is but illustrative of one way which may be followed and obviously various or different ways may be employed, the invention not being limited to any particular method.

What is claimed is:

1. In a chain link, a piece of wire formed intermediate its ends with a pair of abutting eyes and with an integral cross part which extends across the base of each eye, the wire beyond the cross part being shaped to form a bow with the cross part extending across the bases of the eyes adjacent to the inner end of the bow, the ends of the wire being abutted together and shaped to form the outer end of the bow.

2. In a chain link, a piece of wire formed intermediate its ends with a pair of eyes and with a cross member and a bow, the cross-member being disposed between the inner end of the bow and the bases of the eyes and the ends of the wire being bent and welded together to form the outer end of the bow.

3. A wire chain link comprising integral twin eyes formed therein at points intermediate the ends of the wire and having an integral part of the wire extending transversely across the inner ends of the eyes, the wire ends being shaped to form the sides of the bow and the terminals of the wire being bent and welded together to form the outer end of the bow.

4. A wire chain link comprising integral twin eyes formed therein at points intermediate the ends of the wire and having the latter shaped to form the sides of a bow with the eyes at the inner end of the latter and the terminals of the wire being bent and welded together to form the outer end portion of the bow.

5. A wire chain link comprising integral twin eyes formed therein at points intermediate the ends of the wire and having the eyes parallel and at one end of the bow, and the terminals of the wire being bent and abutted together to form the outer end portion of the bow.

In testimony whereof I affix my signature hereto.

JAMES COULTER.